United States Patent
Brenes (10) Patent No.: US 6,293,306 B1
(45) Date of Patent: Sep. 25, 2001

(54) THROTTLE GATE VALVE

(76) Inventor: Arthur Brenes, 5855 Jensen Rd., Castro Valley, CA (US) 94546

( * ) Notice: Subject to any disclaimer, the term of this patent is extended or adjusted under 35 U.S.C. 154(b) by 0 days.

(21) Appl. No.: 09/613,175

(22) Filed: Jul. 10, 2000

Related U.S. Application Data (60) Provisional application No. 60/143,103, filed on Jul. 9, 1999, and provisional application No. 60/194,642, filed on Apr. 4, 2000.

(51) Int. Cl.[7] ............................ F16K 27/12; F16K 51/02
(52) U.S. Cl. ............................ 137/601.09; 137/601.15; 137/601.17; 137/614.11
(58) Field of Search ................ 137/601.09, 601.15, 137/601.17, 613, 614.11, 614.12, 601.11; 251/279, 305

(56) References Cited

U.S. PATENT DOCUMENTS

| | | |
|---|---|---|
| 1,332,000 * | 2/1920 | Pfau . |
| 2,053,668 * | 9/1936 | Kinzie et al. . |
| 5,765,592 | 6/1998 | Karlicek . |
| 5,884,899 | 3/1999 | Brenes . |
| 6,173,939 * | 1/2001 | Dottavio et al. ................. 251/129.12 |

OTHER PUBLICATIONS

Brochure for "Model 1800 Self Tuning Downstream Pressure Control System," Edwards Product Information, Bulletin #1019 (8 pages).
Brochure for "Intellisys, Adaptive Pressure Control for the Next Millennium," Nor–Cal Products, Inc., Jul. 1999 (5 pages).
Brochure for "MeiVac GVQ Series Throttling Gate Valves," MeiVac (4 pages).
Brochure for "Throttle Valves & Controllers," MeiVac, Inc. (12 pages).
Brochure for "Throttle Isolation Valves, Type 656A," MKS Instruments (3 pages).
Brochure for "Downstream Pressure Controllers," MKS (5 pages).

* cited by examiner

Primary Examiner—Stephen M. Hepperle
(74) Attorney, Agent, or Firm—Flehr Hohbach Test Albritton & Herbert (57) ABSTRACT

A throttle gate valve (10) including an upright, generally rectangular valve housing (12), in which is positioned a linearly movable gate valve (32) for closing off a thru-opening (15) formed in the lower part of housing (12). A pneumatic actuator assembly (14) is provided for moving the gate valve between its opened and closed positions. A throttle vane assembly compartment (16) forms the lower side of valve housing (12) and frames thru-opening (15), and includes a set of throttle vanes (18) rotatably positioned within thru-opening (15), and a drive actuator compartment (20) and motor (21) for controlling the position of throttle vanes (18). A drive actuator (51) is provided for rotating vanes (18) and is sealed by a bellows shield (70) at the point where the drive actuator extends into the interior of the housing.

22 Claims, 6 Drawing Sheets

THROTTLE GATE VALVE

RELATED APPLICATION

This application is an improvement upon the throttle gate valve disclosed in my currently filed U.S. Provisional Application, Serial No. 60/143,103, filed Jul. 9, 1999, and my currently filed U.S. Provisional Application of the same title, Serial No. 60/194642, filed Apr. 4, 2000.

TECHNICAL FIELD

The present invention relates to gate valves for applied processing systems and, more particularly, to a gate valve with throttling control for improved control of vacuum pressure with applied processing chambers.

BACKGROUND ART

My U.S. Pat. No. 5,884,899 entitled "HalfProfile Gate Valve ," discloses an improved gate valve with a low-profile design for economy of size, as discussed therein. This reference is incorporated herein. The gate valve of my '899 patent is designed for "opened" and "closed" positions to allow for either full flow or no flow of gaseous fluids through the valve. The present invention improves upon the design of my '899 patent gate valve by providing therewith a throttling valve to provide for variable gas flow in order to precisely control the operating parameters, such as pressure and temperature, within a process chamber.

Throttling butterfly valves and vacuum pressure control throttling multi-vane valves are also known in the art and are commonly used for controlling process variables. Butterfly valve have the advantage of being relatively simple in design, which reduces their cost and maintenance, but they have limited ability to achieve a linear conductance response. Multi-vane throttle valves, such as the Vari-Q Throttle Valve sold by MeiVac, Inc. of San Jose, Calif., USA, provide more precise control than butterfly valves, but are much more complicated in design. Thus, a need exists for a simple throttle valve design that achieves more linear conductance response.

DISCLOSURE OF INVENTION

Briefly described, the throttle gate valve of the present invention comprises a housing defining a thru-opening for controlling vacuum within a process chamber, a gate valve movable between open and closed positions, in the closed position closing off the thru-opening to prevent the passage of process gases, a linear conductance throttle vane movably mounted within the thru-opening for throttling flow of gases through the thru-opening when the gate valve is in its open position, and a drive mechanism for moving the throttle vane in order to vary flow of the process gases, the drive mechanism including a linear drive actuator extending into the housing and including a bellows shield to prevent escape of gases where the linear drive actuator extends into the housing.

The linear conductance throttle valve includes at least one vane that extends across the thru-opening and is rotatably mounted at opposite ends for angular movement between a multiplicity of positions. Preferably, the linear conductance throttle valve includes more than one vane, each symmetrically mounted about its axis of rotation. In this manner, the linear conductance throttle valve provides a substantially linear response across the thru-opening within a pre-selected operating range.

According to an aspect of the invention, the housing includes first and second side chambers, one on each side of the throttle vane. Each side chamber is defined at least partially by an interior wall that provides a rotatable support for the throttle vane, the linear drive actuator extending into the first side chamber and connecting to the throttle vane for rotation of the vane, the housing further including a port providing fluid communication between the first side chamber and the thru-opening. When the thru-opening is at vacuum, so too is the first side chamber.

Preferably, the housing further includes a gate valve chamber for positioning the gate valve in its closed position, and the port provides fluid communication between the first side chamber and the thru-opening via the gate valve chamber. The port is formed to prevent fluid communication between the first side chamber and the process chamber when the gate valve is closed.

According to another aspect of the invention, the housing further includes a gate valve chamber for positioning the gate valve in its closed position, and the port provides fluid communication between the second side chamber and the thru-opening via the gate valve chamber.

According to another embodiment of the invention, the throttle vane assembly is provided for controlling vacuum to a process chamber and includes a housing defining a thru-opening, a throttle vane rotatably mounted in the thru-opening for controlling vacuum pressure to the process chamber, the housing including a side chamber defined at least partially by an interior wall that rotatably supports the throttle vane, a drive mechanism for rotating the throttle vane, the drive mechanism extending into the side chamber from exterior of the housing and drivingly connecting to the throttle vane for rotation thereof, and the housing further including a port for providing fluid communication between the thru-opening and the side chamber, whereby a pressure differential can be avoided between the thru-opening and the side chamber.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defied by the appended claims.

Figure 1:
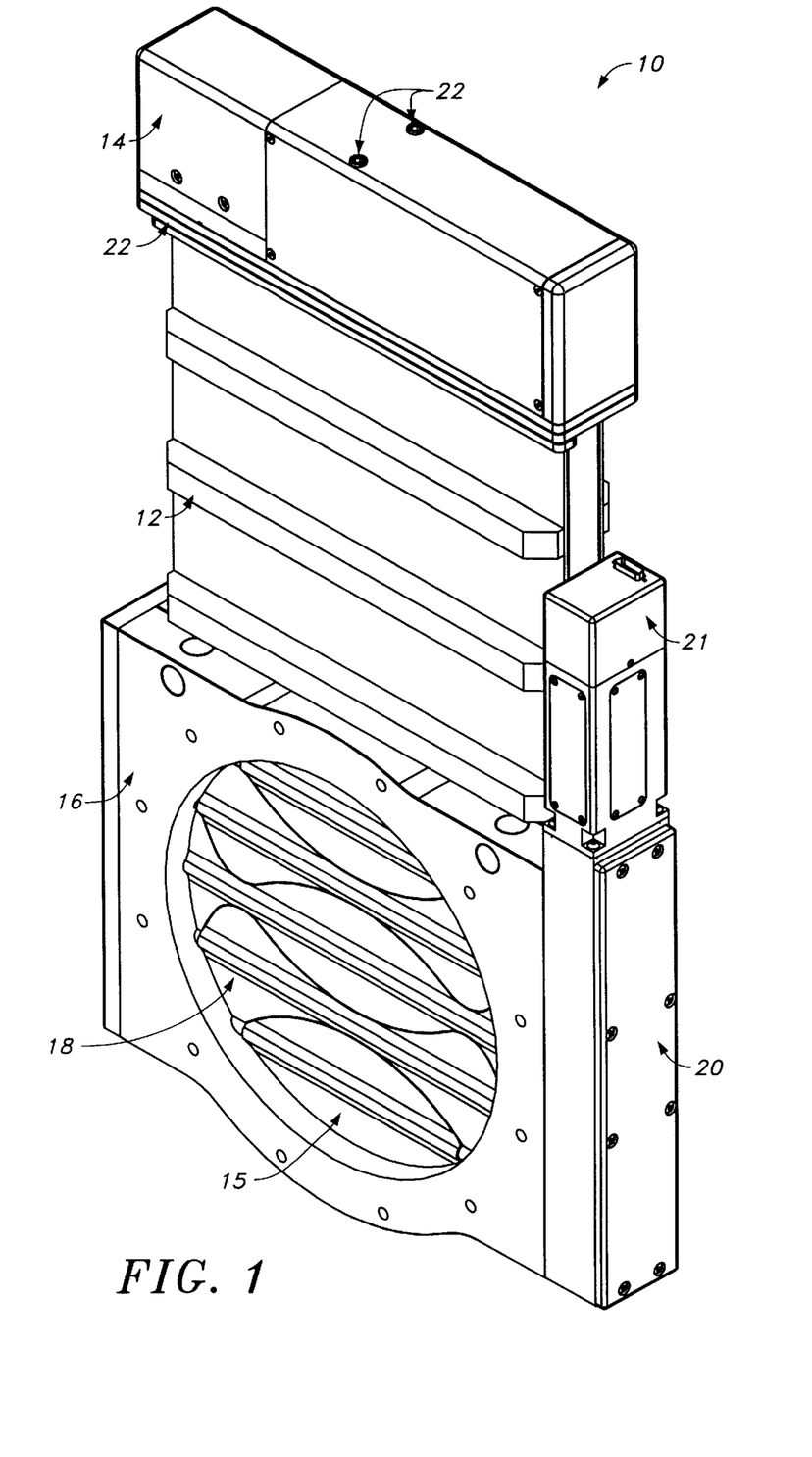
FIG. 1 is a pictorial view of a five-vane embodiment of the improved throttle gate valve of the present invention.

Referring to FIG. 1, a throttle gate valve 10 constructed in accordance with the present invention includes an upright, generally rectangular valve housing 12, in which is positioned a linearly movable gate valve (not shown) for closing off a thru-opening 15 formed in the lower part of housing 12. A pneumatic actuator assembly 14 is provided for moving the gate valve between its opened and closed positions. Actuator assembly 14 and valve housing 12, including the gate valve therein, are disclosed in my aforementioned '899 patent. A throttle vane assembly compartment 16 forms the lower side of valve housing 12 and frames thru-opening 15, and includes a set of throttle vanes 18 rotatably positioned within thru-opening 15, and a drive actuator compartment 20 and motor 21 for controlling the position of throttle vanes 18.

In a preferred application, throttle gate valve 10 is mounted between an applied processing chamber of the type typically used for fabrication of computer chips and a vacuum pump, which is used to evacuate the processing chamber and control vacuum pressure therein during fabrication.

Throttle gate valve 10 also includes an improved quick release clamp mechanism 22 that releasably connects and seals actuator assembly 14 to the upper edge of housing 12, for access to the gate valve when repair and maintenance warrant. Quick release clamp mechanism 22 is disclosed in my co-pending provisional application Serial No. 60/143,141 entitled "Improved Slide Lock," and its utility is discussed therein.

Figure 2A:
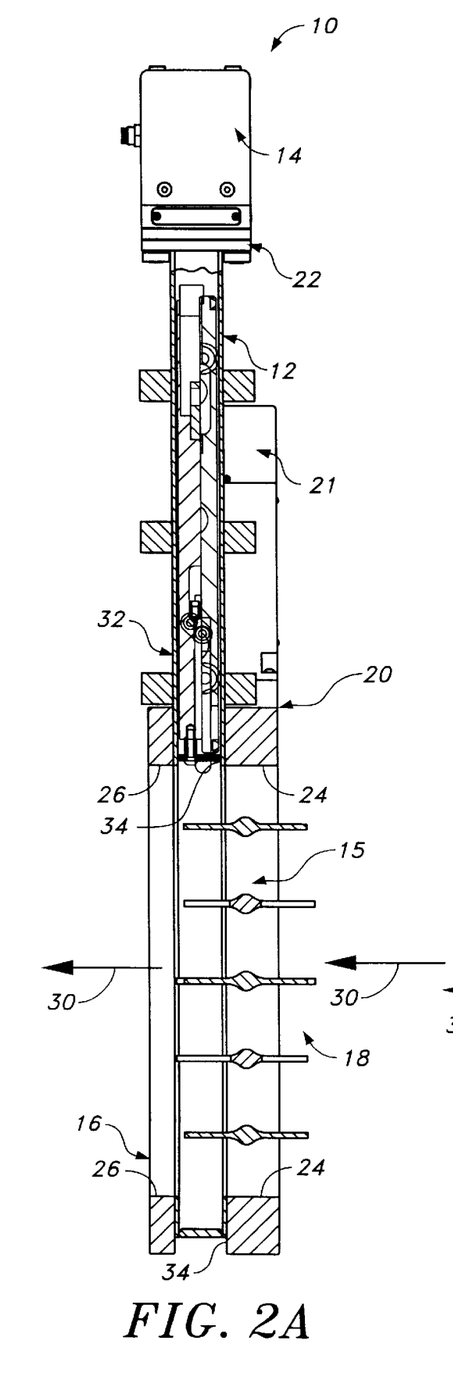
FIG. 2A is a side sectional view, taken along the line 2A—2A of FIG. 6, of the gate valve of FIG. 1.

Referring to FIG. 2A, thru-opening 15 in throttle gate valve 10 is formed by an inlet opening 24 and an outlet opening 26 in the front and back sides, respectively, of the housing, which connect with piping for the passage of process gases in the direction of arrow 30 from an applied processing chamber, such as the type used to manufacturer computer chips, to an evacuation tank where the process gases are scrubbed and cleaned. In operation, throttle vanes 18 are angularly adjusted to control vacuum pressure and temperature within the process chamber for precise control of process variables during chip fabrication. In general, precise control of pressure and temperature within applied processing chambers is becoming more and more critical as the complexity and density of microcomputer chip circuitry increases. Hence the need for greater control of process variables.

Figure 2B:
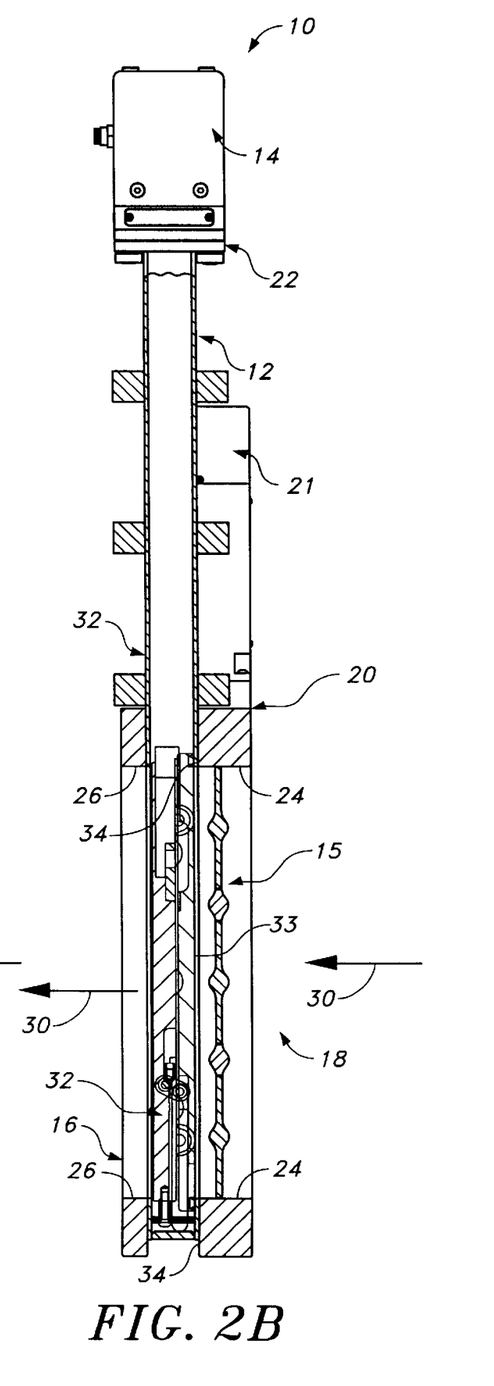
FIG. 2B is a view like FIG. 2A, but with the gate valve and throttle vanes closed.

Within valve housing 12, a gate valve assembly, indicated generally at 32, moves up (as shown) via pneumatic actuator 14 into an open position and down (as shown in FIG. 2B) into a closed position where a valve plate 33 seats against an interior wall 34 to seal off thru-opening 15 and thereby seal valve mechanism 32 and downstream equipment from the process chamber. In its open position (FIG. 2A), gate valve assembly 32 is positioned out of the way to allow for rotation of throttle vanes 18 between a horizontal, fully open position, as shown, to a vertical, fully closed position, and to any position there between.

Figure 6:
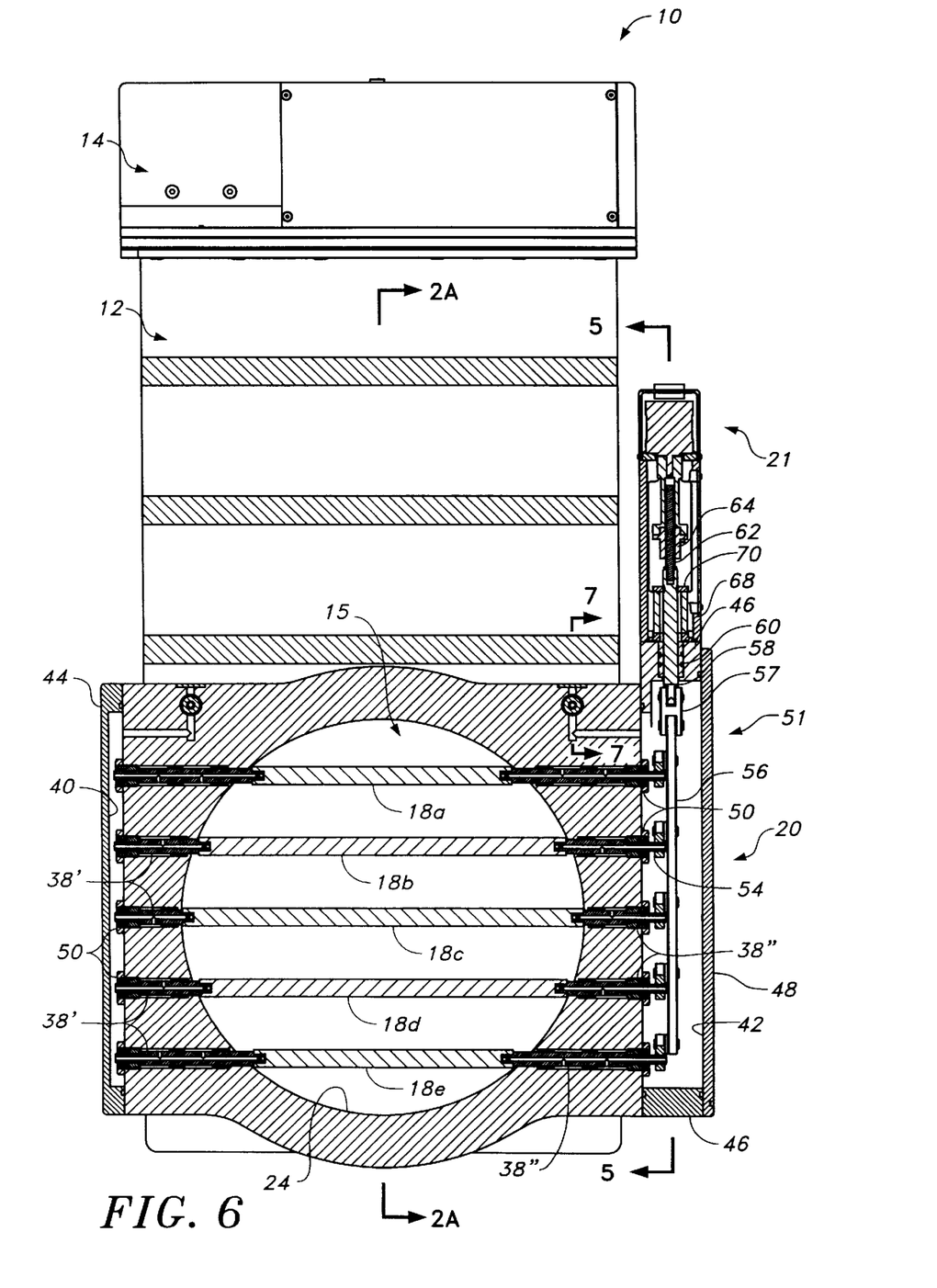
FIG. 6 is a front sectional view like FIG. 3 with the throttle vanes opened.
Figure 7:
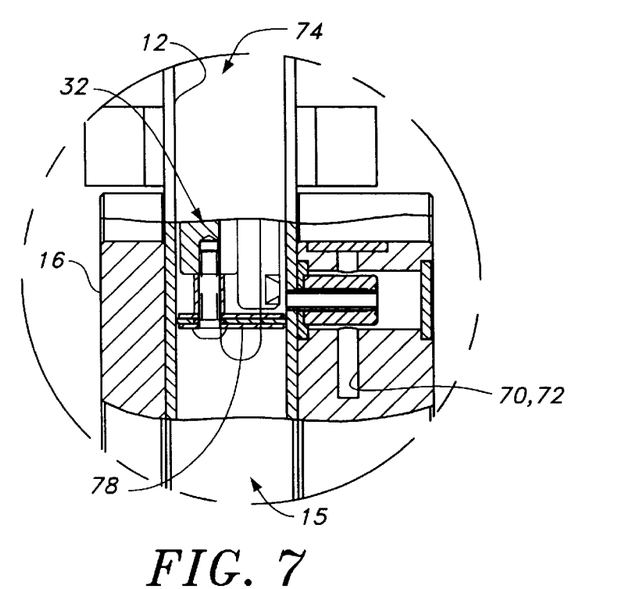
FIG. 7 is a detail sectional view, taken along lines 7—7 of FIG. 6, of the port connection between the valve chamber and the drive side chamber of the gate valve of FIG. 1.
Figure 8:
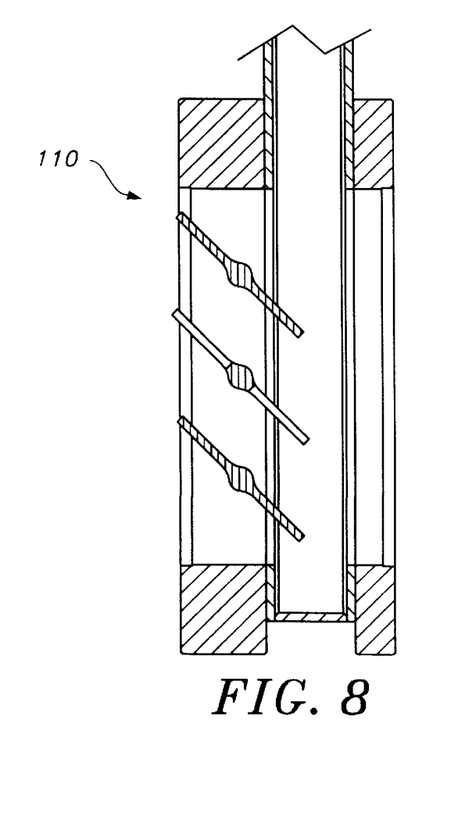
FIG. 8 is an alternative three-vane embodiment of the throttle gate valve of the present invention.
Figure 9:
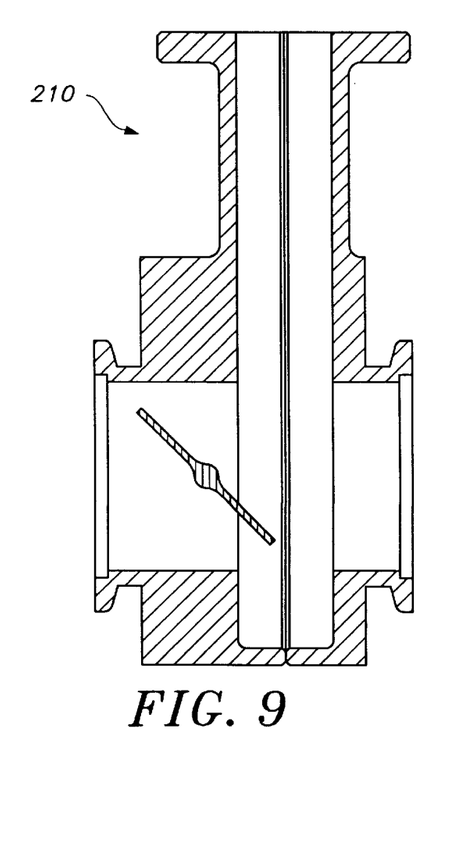
FIG. 9 is a third alternative single-vane embodiment of the throttle gate valve of the present invention.

While the throttle gate valve embodiment of FIGS. 1–7 is illustrated with five throttle vanes, the throttle gate valve of the present invention is not meant to be limited to a specific number of vanes and, as discussed with reference to FIGS. 8 and 9, a three-vane embodiment and a single vane embodiment, as well as any number of vane assemblies, are meant to be included within the scope of the present invention.

It is preferable that throttle vanes 18 be positioned so that they rotate clockwise from a fully closed position to a fully open position, so that the angle between the throttle vanes and gate valve mechanism 32 is oblique or at a right angle at all times. This arrangement prevents potential damage to the throttle vane and/or gate valve mechanism should the gate valve mechanism inadvertently close when the throttle vanes are open and in the path of movement of the gate valve mechanism.

Figure 3:
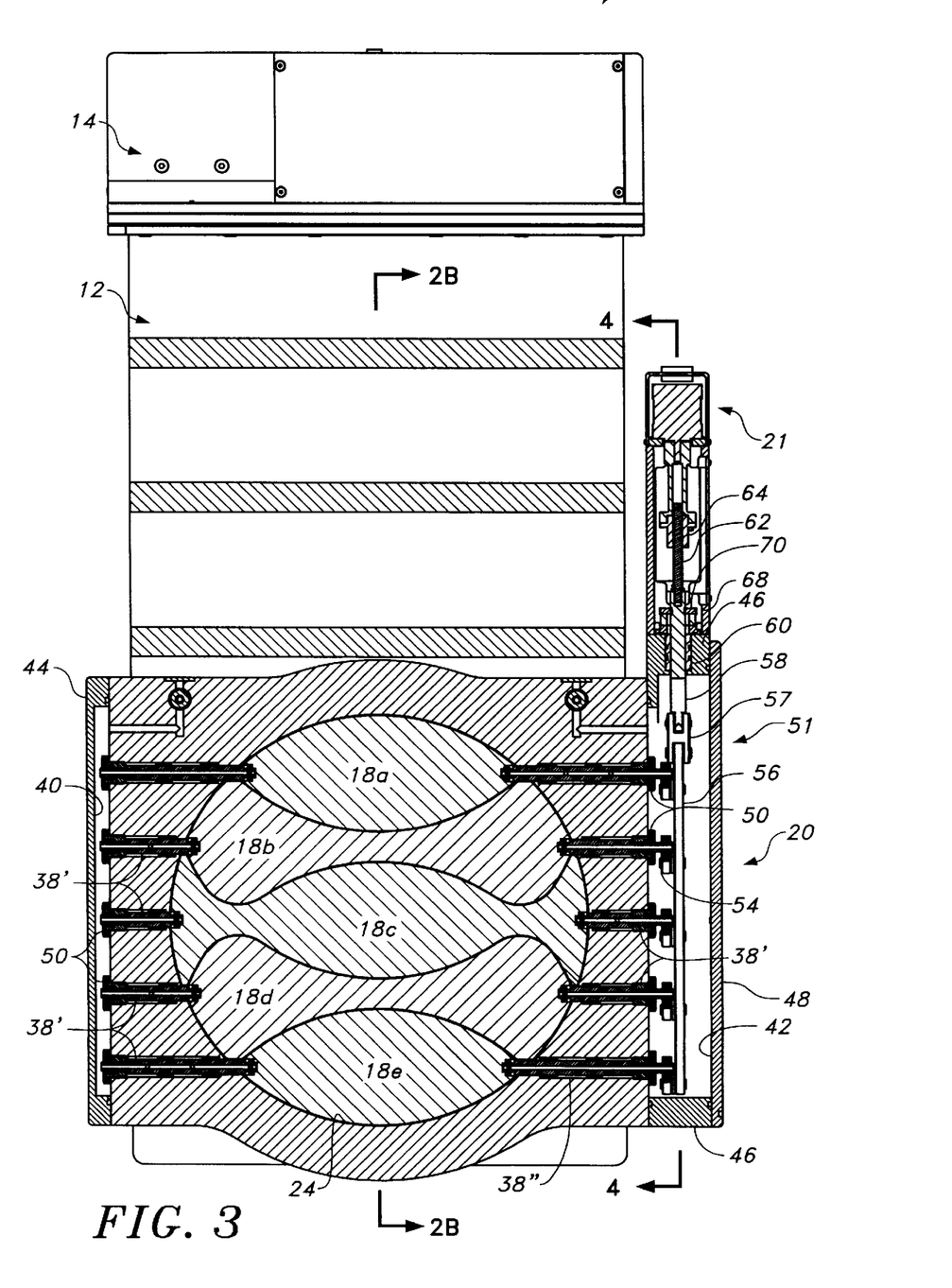
FIG. 3 is a front sectional view, taken along the lines 3—3 of FIG. 4 of the throttle vane assembly of the gate valve of FIG. 1.

Referring to FIG. 3, the five-vane embodiment of the throttle gate valve of the present invention includes a set of aligned, symmetrically mounted vanes 18a–18e, each of which is rotatably mounted by a pair of vane shafts 38', 38" for rotation about their respective symmetrical longitudinal axis of rotation. Vane shafts 38', 38", in turn are rotatably mounted within vane compartment 16 and each includes suitable seals and bushings to prevent leakage of gases there through. Vane shafts 38' are mounted opposite the drive actuator compartment 20 while vane shafts 38" are directly coupled to the drive components of the drive actuator.

It is important that each vane 18a–18e be symmetrically mounted for rotation about its longitudinal centerline in order to achieve near linear conductance of process gases past the throttle vanes. During application of process gases within the process chamber, precise control of the vacuum pressure is better achieved by laminar flow with linear conductance of process gases through the vanes in response to changes in pressure within the process chamber. Symmetrically mounted vanes provide a more linear conductance because the flow of gas molecules and particles past the outer edges of each vane is more balanced across the thru-opening of the vane compartment, as well as on the sides of each vane. While the response of vanes 18a–18e is not linear as the position of the vanes approach filly closed positions, within the operating range of vacuum pressures for many applied processing systems, the flow response of the vane assembly is nearly linear.

Valve housing 12, and particularly vane compartment 16, includes first and second interior side chambers, preferably in the form of an end chamber 40 and a drive side chamber 42. End chamber 40 is formed by an end plate 44 with an interior side recess that forms chamber 40 when end plate 44 is bolted and sealed to the outer side of housing 12. Drive side chamber 42 is formed by a substantially rectangular side wall 46 closed by a side access plate 48, with plate 48 being bolted and sealed to side wall 46, and side wall 46, in turn, being bolted and sealed to the outer side of housing 12. Side chambers 40, 42 are provided for reasons discussed later.

Vane shafts 38', 38" are longitudinally adjustably mounted within housing 12 by means of threaded adjustment nuts 50, which are both interiorly and exteriorly threaded for threadably connecting to exterior threads on the vane shafts. Adjustment nuts 50 allow for rotation of vane shafts 38 within nuts 50 in order to adjust the shafts' longitudinal alignment and thereby ensure precise alignment within the circular dimensions of inlet opening 24.

Figure 4:
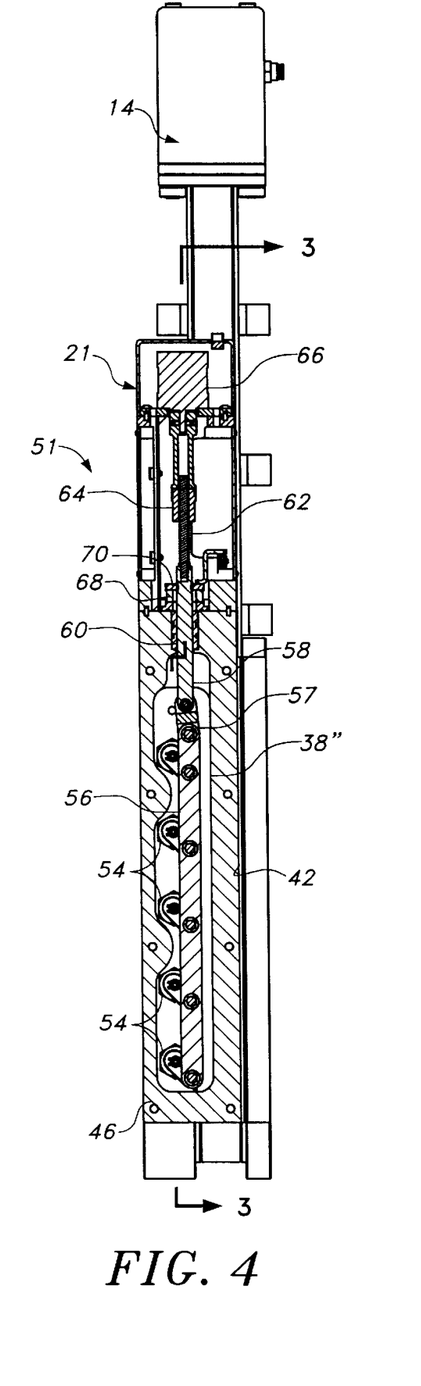
FIG. 4 is side sectional view, taken along the lines 4—4 of FIG. 3 of the drive actuator for controlling the throttle vanes of FIG. 3.

Referring to FIGS. 3 and 4, a drive actuator assembly, indicated generally at 51, is provided for rotating vanes 18a–18e. Drive actuator assembly 51 includes a set of short transverse links 54, which are each connected at one end to a vane shaft 38" and are each in turn pivotally joined at their opposite end to an upright connecting drive bar 56, which pivots, in unison, each transverse link 54 and their respective vane shafts for simultaneous movement of the vanes. A short pivot link 57 drivingly connects drive bar 56 to a drive rod 58 that is mounted for linear movement within side wall 46 by a bushing 60. Drive rod 58 in turn is connected to a drive shaft 62 that is exteriorly threaded and driven by rotation of a drive collar 64 mounted to the output shaft of an electric stepper motor 66.

At the point where drive rod 58 extends into side chamber 42 through side wall 46, just above bushing 60, a bellows shield 68 is provided around drive rod 58 to seal side chamber 42 and thereby prevent escape of process gases from the housing interior. Bellows shield 68 is similar to the bellows shield discussed in my aforementioned '899 patent. In general, at any point where a moving component extends into a sealed housing, leakage is difficult to prevent with just an o-ring seal against the moving component. Bellows shield 68 improves the seal by providing an air-tight seal with its flexible, bellows construction and a fixed, sealed mounting to side wall 46 at its bottom side and to a bellows flange 70 at its upper side. Bellows flange 70 is mounted to drive rod 58, so that as drive rod 58 moves linearly, bellows shield 68 expands and contracts, while maintaining an air tight seal.

Suitable controls are provided to sense the pressure and temperature within the vacuum chamber and, in response to changes in these process variables, throttle open or closed the vanes 18a–18e. For clarity, the controls are not shown but should be understood by one skilled in the art.

In operation, stepper motor 66 rotates drive collar 64, which in turn causes linear movement of drive shaft 62 and drive rod 58 connected thereto. As drive rod 58 moves linearly, pivot link 56 transmits the linear drive force of rod 58 to drive bar 56, which then orbits or rocks about the axis of vane shafts 38". Rocking movement of drive bar 56 causes transverse links 54 to rotate vane shafts 38", which in turn effects the angular rotation of vanes 18a–18e.

Figure 5:
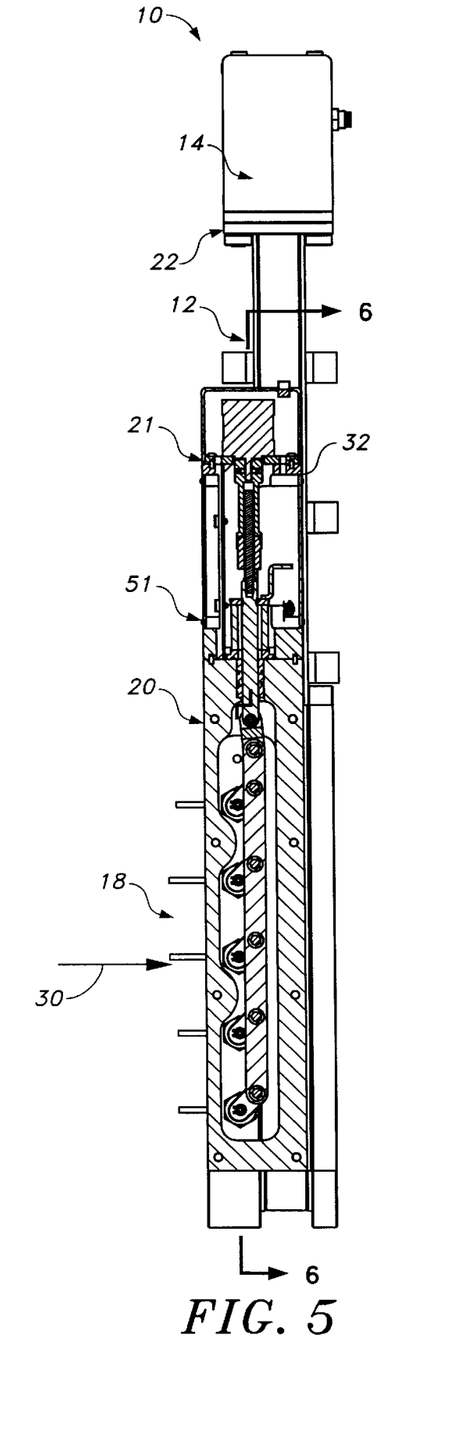
FIG. 5 is a side sectional view, taken along the lines 5—5 of FIG. 6 of the drive actuator operated to open the throttle vanes.

FIG. 4 shows the drive actuator assembly in an extended position, which fully closes the vanes. FIG. 5 shows drive actuator assembly 51 fully retracted, which fully opens the vanes, as shown in FIG. 6. Stepper motor 66 is controllable to position vanes 18a–18e at any of a multiplicity of angular positions between the open and closed positions shown in FIGS. 6 and 3 as necessary to precisely control the vacuum pressure in the process chamber.

Referring to FIG. 6, vane compartment 16 includes a pair of ports 70, 72 bored therein, which lead, respectively, from drive side chamber 42 and end chamber 40 to the interior of housing 12 to provide fluid communication with the central part of thru-opening 15 of the gate valve. As illustrated in FIG. 7, ports 70, 72 each provide fluid communication between the valve chamber 74 above thru-opening and the side and end chambers to which they lead. The purpose of ports 70, 72 is discussed later.

In FIG. 7, gate valve assembly 32 is shown in its open position with the gate valve raised up out of thru-opening 15. Preferably, gate valve assembly 32 is provided with a shield plate 78 that is the subject of my co-pending patent application Ser. No. 09/109,778, file Jul. 2, 1998. Shield plate 78 provides a non-air tight shield between thru-opening 15 and valve chamber 74, to limit the escape of process gases from the process chamber into valve chamber 74 where the gases can cause damage to the gate valve components.

The provision of ports 70, 72 allows for end chamber 40 and drive side chamber 42 to be pumped down to vacuum pressures via thru-opening 15, thereby achieving balanced pressures at each end of vane shafts 38. A balancing of pressures on each side of vane shafts 38 prevents leakage into thru-opening 15 from exterior of the thru-opening, which allows for more precise control of pressures within the throttle gate valve.

In addition, valve chamber 74 can be provided with a purge port, as discussed in my co-pending application Ser. No. 09/109,778, to introduce a protective, inert gas into the valve chamber. Ports 70, 72 lead to valve chamber 74 at a level above shield plate 78. This allows for flow of an inert gas introduced into valve chamber 74 to migrate into end chamber 40 and side chamber 42, which inert gas better protects the vane shaft components, and particularly the drive actuator components within side chamber 42, from potentially damaging process gases FIG. 8 shows a three vane assembly 110 for the throttle gate valve of the present invention and FIG. 9 shows a single-vane assembly 210 for the same. The bellows shield drive actuator and ported side chamber features are provided with both of these embodiments and are the same as discussed with reference to FIGS. 1–7.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

The invention claimed is:

1. A throttle gate valve, comprising a housing defining a thru-opening for controlling vacuum within a process chamber, a gate valve movable between open and closed positions, in the closed position closing off the thru-opening to prevent the passage of process gases, a linear conductance throttle vane movably mounted within the thru-opening for throttling flow of gases through the thru-opening when the gate valve is in its open position, and a drive mechanism for moving the throttle vane in order to vary flow of the process gases, the drive mechanism including a linear drive actuator extending into the housing and including a bellows shield to prevent escape of gases where the linear drive actuator extends into the housing.

2. The throttle gate valve of claim 1 wherein,
the linear conductance throttle valve includes at least one vane that extends across the thru-opening and is rotatably mounted at opposite ends for angular movement between a multiplicity of positions.

3. The throttle gate valve of claim 2 wherein,
the linear conductance throttle valve includes more than one vane, each symmetrically mounted about its axis of rotation.

4. The throttle gate valve of claim 3 wherein,
the linear conductance throttle valve provides a substantially linear response across the thru-opening within a pre-selected operating range.

5. The throttle gate valve of claim 1 wherein,
the housing includes first and second side chambers, one on each side of the throttle vane, and each side chamber being defined at least partially by an interior wall that provides a rotatable support for the throttle vane, the linear drive actuator extending into the first side chamber and connecting to the throttle vane for rotation of the vane, the housing further including a port providing fluid communication between the first side chamber and the thru-opening,
so that when the thru-opening is at vacuum, so too is the first side chamber.

6. The throttle gate valve of claim 5 wherein,
the housing further includes a gate valve chamber for positioning the gate valve in its closed position, and
the port provides fluid communication between the first side chamber and the thru-opening via the gate valve chamber.

7. The throttle gate valve of claim 5 wherein,
the port is formed to prevent fluid communication between the first side chamber and the process chamber when the gate valve is closed.

8. The throttle gate valve of claim 5 wherein,
the housing includes a second port for providing fluid communication between the second side chamber and the thru-opening.

9. The throttle gate valve of claim 8 wherein,
the housing further includes a gate valve chamber for positioning the gate valve in its closed position, and
the port provides fluid communication between the second side chamber and the thru-opening via the gate valve chamber.

10. The throttle gate valve of claim 1 wherein,
the linear drive actuator includes a drive rod mounted for linear movement, including an inner end extending into the housing of the throttle gate valve for driving connection to the throttle valve and an outer end exterior of the housing, the bellows shield connected at one end to the outer end of the drive rod and at another end to the housing.

11. The throttle gate valve of claim 10 wherein,
the housing includes a seal around the drive rod so that the inner end of the drive rod can be exposed to vacuum pressures while the outer end of the drive rod is exposed to atmosphere.

12. The throttle gate valve of claim 11 wherein,
the linear drive actuator includes a drive motor, a tubular, interiorly threaded drive shaft drivingly mounted to the drive motor, and an exteriorly threaded screw threadably secured within the threaded drive shaft for linear movement in response to rotation of the drive shaft.

13. The throttle gate valve of claim 10 wherein,
the housing includes an interior chamber that houses the linear drive actuator and its connection to the throttle vane, and the housing further includes a first port leading from the interior chamber to the thru-opening, for providing fluid communication there between.

14. The throttle gate valve of claim 13 wherein,
the throttle vane is rotatably mounted to shafts at opposite sides of the throttle valve, one of the shafts extending into the interior chamber, the housing including a second side chamber from which the other of the shafts is accessible, and the housing further including a second port leading from the second side chamber to the thru-opening, for providing fluid communication there between.

15. The throttle gate valve of claim 14 wherein,
the housing includes a gate valve chamber for positioning the gate valve in its open position, the housing further including a purge port for introducing a gas into the gate valve chamber, the first and second ports providing fluid communication via the gate valve chamber, whereby the gas introduced into the gate valve chamber can migrate to the interior chamber and the second side chamber.

16. The throttle gate valve of claim 15 wherein,
the gate valve includes a shield at the lower end of the gate valve, the shield adapted to minimize flow of gases into the gate valve chamber when the gate valve is in its open position, the first and second ports being positioned on the gate valve chamber side of the shield.

17. A throttle vane assembly for controlling vacuum to a process chamber, comprising:
a housing defining a thru-opening,
a throttle vane rotatably mounted in the thru-opening for controlling vacuum pressure to the process chamber,
the housing including a first side chamber defined at least partially by an interior wall that rotatably supports the throttle vane,
a drive mechanism for rotating the throttle vane, the drive mechanism extending into the side chamber from exterior of the housing and drivingly connecting to the throttle vane for rotation thereof,
the housing further including a port for providing fluid communication between the thru-opening and the side chamber,
whereby a pressure differential can be avoided between the thru-opening and the side chamber.

18. The throttle vane assembly of claim 17 wherein,
the housing includes first and second side chambers, one on each side of the throttle vane, and each side chamber being defined at least partially by an interior wall that provides a rotatable support for the throttle vane, the linear drive actuator extending into the first side chamber and connecting to the throttle vane for rotation of the vane, the housing further including a port providing fluid communication between the first side chamber and the thru-opening,
so that when the thru-opening is at vacuum, so too is the first side chamber.

19. The throttle gate valve of claim 18 wherein,
the housing further includes a gate valve chamber for positioning the gate valve in its closed position, and
the port provides fluid communication between the first side chamber and the thru-opening via the gate valve chamber.

20. The throttle gate valve of claim 18 wherein, the port is formed to prevent fluid communication between the first side chamber and the process chamber when the gate valve is closed.

21. The throttle gate valve of claim 18 wherein, the housing includes a second port for providing fluid communication between the second side chamber and the thru-opening.

22. The throttle gate valve of claim 21 wherein, the housing further includes a gate valve chamber for positioning the gate valve in its closed position, and the port provides fluid communication between the second side chamber and the thru-opening via the gate valve chamber.

\* \* \* \* \*